W. MANSFIELD.
Wagon-Spring.
No. 67,128.
Patented July 23, 1867.
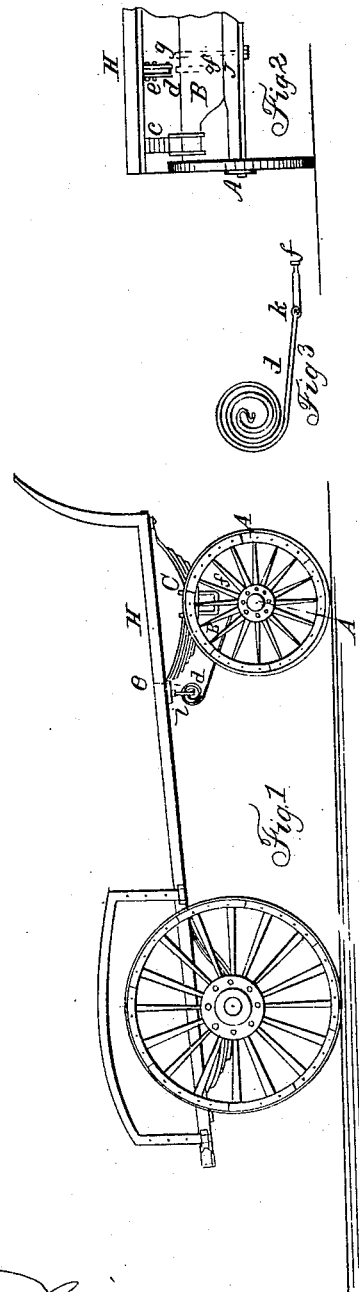

United States Patent Office.

WARREN MANSFIELD, OF SOUTH BRAINTREE, MASSACHUSETTS.

Letters Patent No. 67,128, dated July 23, 1867.

IMPROVEMENT IN SPRING WAGONS.

The Schedule referred to in these Letters Patent and making part of the same.

TO ALL WHOM IT MAY CONCERN:

Be it known that I, WARREN MANSFIELD, of South Braintree, in the county of Plymouth, and State of Massachusetts, have invented a new and useful Spring Caravan or Wagon; and I do hereby declare that the following is a full, clear, and exact description of the construction and operation of the same, reference being had to the accompanying drawing forming a part of this specification, and containing three figures.

The intention of my invention is to make a new sort of spring wagon without a perch, and I do it by taking what is ordinarily known as a caravan, placing in any ordinary way springs under the hinder end, and in the following arrangements constituting my invention at the forward end: first, arranging semi-elliptic springs hooked at their hinder end to the wagon body, and with their centres resting on the rocker; and, second, in combining with this arrangement one or more centrally situated volute springs fastened at one end to the body of the wagon, and at the other to the rocker. In the drawings—

Figure 1 is a side elevation of a caravan placed in my method upon springs.

Figure 2 is a front elevation of such a caravan, and

Figure 3 is a side elevation of the volute spring and its hook enlarged.

A is the forward wheel; I, the axle-stock; B, the rocker; $g$, the transient bolt. I make no claim to have invented or discovered this arrangement. Upon the ends of the rocker B I attach the centres of springs C in any ordinary way, and I hook these to blocks or bolts in the side bars of the wagon, as shown at $i$, fig. 1. To prevent the forward end of the springs C from opening when pressed by a heavy load, I arrange a spring-brace, $d$, shaped as a volute spring, its outer end somewhat elongated, and formed with a hook, $k$, and fastening the centre of this spring to the wagon body, as shown at $e$ by straps; I hook the hook $k$ into the loop of bolt $f$, passing through the rocker, and giving the desired tension to the spring-brace by a screw and nut on its end. It may sometimes be desirable to have a spring-brace before as well as behind this rocker, or to have several braces.

I am not aware that this kind of wagon has ever been mounted upon simple springs. And this arrangement differs from the arrangement in use for hacks and omnibuses, in that the transient bolt is below the springs, while in those carriages it is above them. My arrangement is also cheap and simple, and gives for use a new intermediate wagon, and I therefore claim—

1. The arrangement upon rocker B of springs C, connected as described with the wagon body at $i$; and 2. The arrangement of volute spring-brace $d$, connected, as described, with wagon body H and rocker B, when the rocker carries springs C attached to the wagon body, substantially as described.

WARREN MANSFIELD.

Witnesses:
THOS. WM. CLARKE,
E. A. RAYMOND.